Aug. 2, 1927. E. T. WILLIAMS Re. 16,693

RECIPROCATING COMPRESSOR

Original Filed Dec. 1, 1923 2 Sheets-Sheet 1

Inventor
Edward T. Williams
By
Wm. T. Hedlund
his Attorney

Aug. 2, 1927. Re. 16,693

E. T. WILLIAMS

RECIPROCATING COMPRESSOR

Original Filed Dec. 1, 1923 2 Sheets-Sheet 2

Inventor
Edward T. Williams
By
H. T. Hedlund
his Attorney

Reissued Aug. 2, 1927. Re. 16,633

UNITED STATES PATENT OFFICE.

EDWARD T. WILLIAMS, OF BROOKLYN, NEW YORK, ASSIGNOR TO REFRIGERATION DEVELOPMENT, INC., OF NEW YORK, N. Y., A CORPORATION OF NEW YORK.

RECIPROCATING COMPRESSOR.

Original No. 1,556,059, dated October 6, 1925, Serial No. 677,926, filed December 1, 1923. Application for reissue filed May 9, 1927. Serial No. 190,039.

This invention relates to electrically driven compressors for air and other gases, particularly gases and vapors used as refrigerating media, and its chief object is to provide a compressor and driving mechanism therefor in which the use of rotating parts, and likewise the use of packing for piston rods, is avoided. To this and other ends the invention comprises the novel features hereinafter described.

The invention is especially adapted for so-called household refrigerating systems, in which durability, reliability, and freedom from complication are of prime importance, and I have accordingly selected for specific description herein an embodiment designed particularly for the purpose mentioned. For this purpose I prefer single-acting reciprocating compressors with aligned or parallel compression cylinders, with pistons actuated by the core or cores of a pair of solenoids. The latter are preferably axially aligned, and are energized in alternation by the two wave-halves of single phase alternating current, the waves being split and the positive half sent through one solenoid and the negative half through the other, by suitable "rectifying" means, preferably of the electrolytic or vacuum tube type.

Referring to the accompanying drawing.

Figure 1:
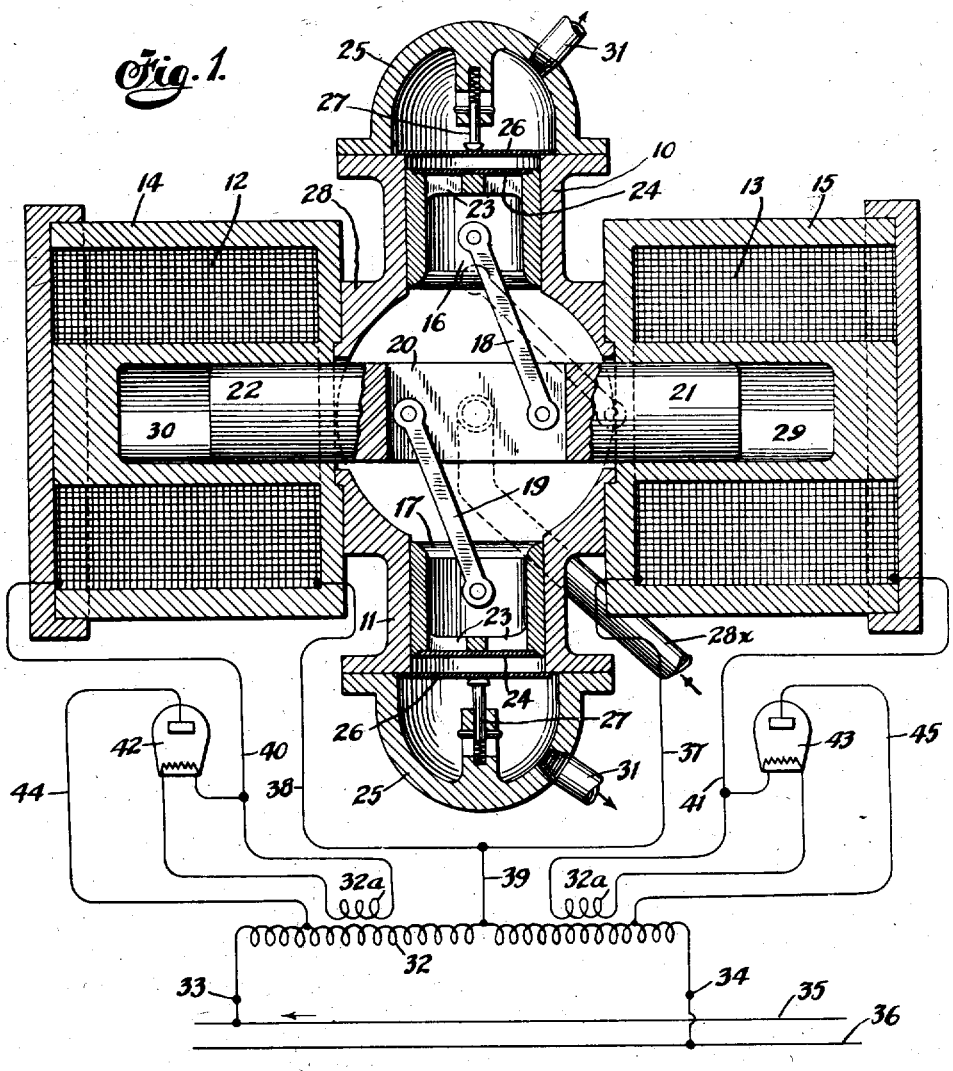
Fig. 1 is a longitudinal section of a double acting compressing apparatus embodying my present invention.

In Fig. 1, the two compression cylinders 10, 11 are arranged in axial alignment, and the solenoids 12, 13, enclosed in suitable casings 14, 15, are also in axial alignment but at right angles to the cylinders. The pistons 16, 17 are connected by connecting rods or links 18, 19, to the longitudinally slotted member 20 connecting the two cores 21, 22. The core, connecting rod, and piston assembly is shown in mid-position. Each piston has ports 23, controlled by a valve 24 of the spring disk type, consisting of a disk of spring metal secured at its center to the piston in any convenient manner, as by spot-welding. Over each cylinder is a chamber or dome 25, with a valve 26. The latter is of the same type as valve 24, but is attached to a spring-pressed pin 27 so that the disk not only can flex but can also move bodily.

The two cylinders, 10, 11, are integral with a hollow central member 28, fitted in a gas-tight manner to the solenoid casings 14, 15, and the bores 29, 30, in which the cores 21, 22 travel, are closed at their outer ends, the two solenoid casings and the central member forming an elongated closed chamber communicating with the intake ends of the two cylinders. The two cores 21, 22, wholly inside of this chamber, reciprocate therein, and the solenoid coils are enclosed in what may be termed outer compartments. The gas to be compressed is supplied to the chamber through an inlet pipe 28× and the compressed gas escapes from the domes 25 through pipes 31. It will therefore be seen that the apparatus has no rod or shaft requiring packing.

The solenoids 12, 13 are energized in alternation by the positive and negative impulses of alternating current, directed to the respective solenoids by suitable rectifying means, as for example the system illustrated diagrammatically in Fig. 1. In this figure, 32 represents a transformer having terminals 33, 34, for connection with a single phase circuit represented by the mains 35, 36. Wires 37, 38, 39 connect one terminal of each solenoid to the neutral point of the transformer, and wires 40, 41 connect the other terminals to the filaments of the vacuum tubes 42, 43, while the plate electrodes of the latter are connected by wires 44, 45 to such turns of the transformer as will give the desired voltage across the solenoid terminals. Inasmuch as current can flow from plate to filament but not from filament to plate, it will be seen that a positive impulse, say in the direction of the arrow, will flow through terminal 33, transformer 32, wire 44, tube 42, wire 40, solenoid 12, wires 38, 39, transformer 32, and terminal 34 to main 36. Solenoid 12 is thus energized and core 22 drawn toward the left, thereby retracting piston 17 and advancing piston 16. Similarly, the ensuing negative impulse, beginning to flow when the first has fallen to zero, passes only through solenoid 13; and since solenoid 12 is de-energized, core 21 moves toward the right, retracting piston 16 and advancing piston 17. This cycle of operation is repeated at each cycle of the current, thus reciprocating the cores and pistons at the same rate. The filaments in the rectifier tubes are heated by current from the secondary windings $32^a$ in the transformer 32.

As piston 16, for example, is retracted, valve 24 opens and admits gas through ports 23, valve 26 of course being closed by the pressure in dome 25. When the piston advances, valve 24 closes and the pressure produced above the piston opens valve 26, permitting the gas to flow into the dome. In the meantime the same operations are being performed by piston 17, but in the reverse order.

Figure 2:
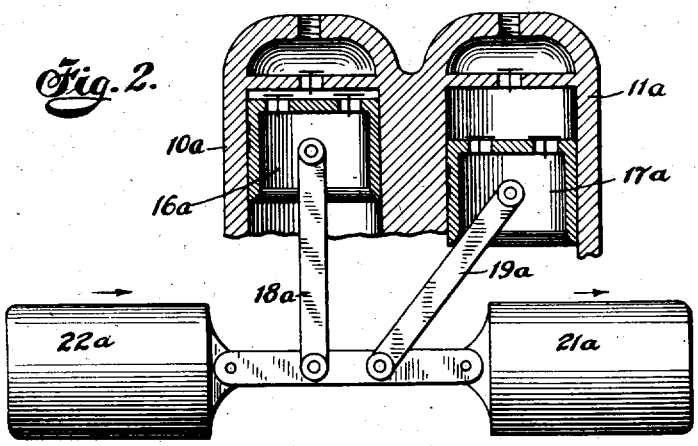
Figs. 2, 3 and 4 are fragmentary sectional views showing other forms.
Figure 3:
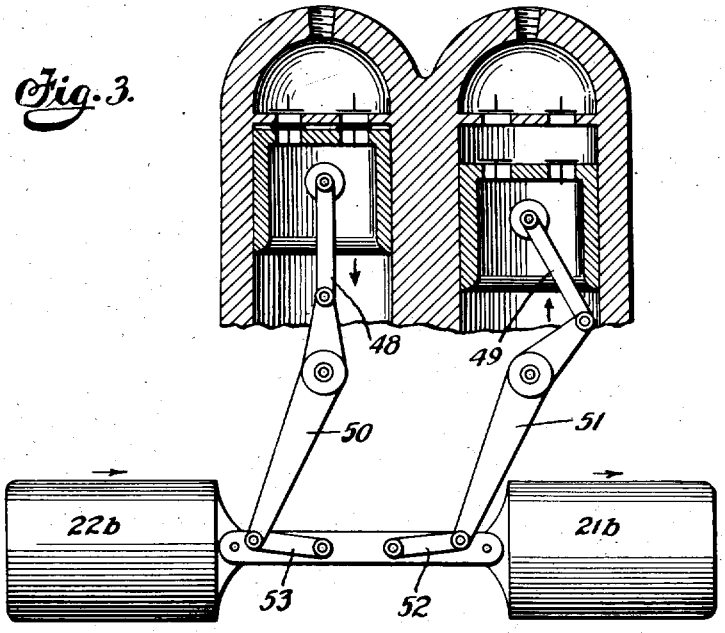

In the modification illustrated in Fig. 2 the cylinders $10^a$, $11^a$ are arranged side by side instead of in alignment, and the pistons $16^a$, $17^a$ are connected by connecting rods $18^a$, $19^a$ to the cores $21^a$, $22^a$. In Fig. 3 a similar arrangement of cylinders is employed but the pistons are connected by links 48, 49 to bell crank levers or rockers 50, 51, which are in turn connected by links 52, 53 to the cores $21^b$, $22^b$.

Figure 4:
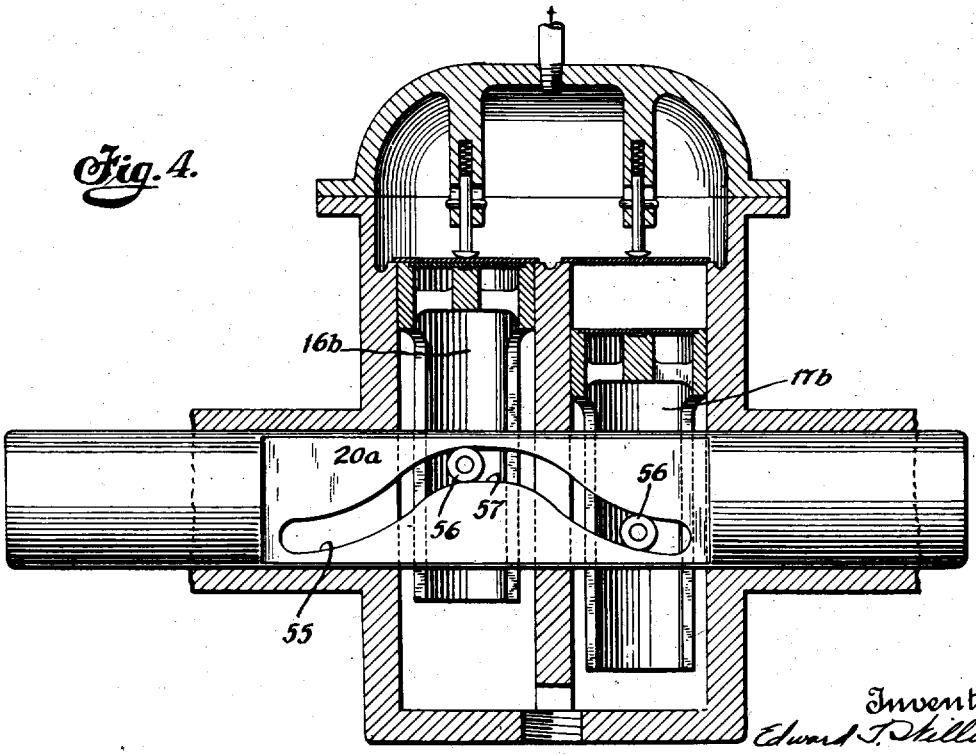

In the modification illustrated in Fig. 4 the cylinders and pistons are lengthened, and extend below the path of the cores, to afford resistance to the lateral thrusts incident to the reciprocation of the cores. Also, the pistons are actuated by a cam-slot 55 in the member $20^a$ connecting the two cores. For this purpose the pistons are slotted so as to straddle the member $20^a$, and are provided with wrist-pins 56 extending through the cam-slot. Preferably, the cam-slot is shaped with a short dwell, 57, parallel to the path of the cores, while the outer portions of the slot are inclined to, or almost to, their ends, so that if the cores should "overthrow" (that is, travel past the position at which a given piston reaches the upper limit of its travel) the piston which is on the compression stroke will remain stationary but the other (on the suction stroke) will travel farther and thus take in an increased amount of gas. For example, in the figure the piston $16^b$ is at the top of its stroke. If, now, the cores do not reverse, but continue moving to the left, the dwell 57 in the cam-slot will keep piston $16^b$ stationary, but the inclined end of the right arm of the slot will carry piston $17^b$ down farther, and thus cause it to take in a greater volume of gas. Hence if the load on the machine is light enough to permit the cores to overthrow, the capacity of the machine is increased in a compensating manner. Upon reflection it will be seen that a like compensation is provided in Figs. 1, 2 and 3, but that the piston which is on the compression or discharge stroke does not remain stationary. Thus in Fig. 2, for example, overthrow to the left will carry both pistons down slightly, but $17^a$ farther than $16^a$. Then on the right-ward movement of the cores the former piston will have a short compression stroke, followed by its normal suction stroke.

In Figs. 2 and 3 the valves are shown (diagrammatically) as of the poppet type, merely to indicate that the invention is not, in general, confined to any particular type.

It is to be understood that the invention is not limited to the specific constructions herein illustrated and described but can be embodied in other forms without departure from its spirit as defined by the following claims.

I claim:

1. In a compressor, in combination, a pair of compression cylinders, reciprocating pistons therein, a pair of solenoids, reciprocating cores actuated by the solenoids and connected to the pistons to reciprocate the same, and means for passing the positive waves of alternating current predominantly through one solenoid and the negative waves predominantly through the other, whereby the solenoids are activated alternately.

2. In a compressor, in combination, a pair of compression cylinders, a closed chamber communicating with both cylinders at the intake ends thereof and having an inlet for the gas to be compressed, pistons in the cylinders, a pair of reciprocating cores arranged wholly within said chamber and connected with the pistons to actuate the same, solenoids, associated with the cores to reciprocate the same, and alternating current means for energizing the solenoids in alternation.

3. In a compressor, in combination, a pair of spaced coaxial solenoids, casings therefor having inwardly open aligned recesses closed at their outer ends, connected cores mounted to reciprocate in said recesses, a hollow member enclosing the cores between the solenoid casings and hermetically sealed to the latter to form in conjunction with said recesses a closed chamber in which the cores travel, a pair of compression cylinders open at their intake ends to said chamber and hermetically connected thereto, pistons in the cylinders, connected to the cores through the open intake ends of the cylinders for reciprocation by the cores, and means for energizing the solenoids in alternation.

4. In a compressor, in combination, a pair of compression cylinders having their intake ends open, a chamber hermetically connected to the cylinders at their intake ends, open thereto and provided with a gas inlet opening but otherwise closed, pistons in the cylinders, a pair of cores wholly within said chamber and connected through their open ends to the pistons for reciprocation thereby, solenoids associated with the cores to reciprocate the same, and means for energizing the solenoids alternately.

5. In a compressor, in combination, a closed chamber of elongated form having a gas inlet and axially aligned transversely arranged cylinders having their inner ends open to the interior of the chamber, a pair of aligned cores wholly within said chamber and arranged to reciprocate longitudinally thereof at right angles to the cylinders, pistons in the cylinders, connected through the open ends of the cylinders to the cores for reciprocation thereby, solenoids associated with the cores to reciprocate the same, and means for energizing the solenoids alternately.

6. In a compressor, in combination, a closed chamber having compression cylinders open at their intake ends to the interior of the chamber, pistons in the cylinders, solenoids associated with said chamber, solenoid cores wholly within said chamber and connected to the pistons through the open ends of the cylinders to actuate the pistons, and means for passing the positive waves of alternating current predominantly through one solenoid and the negative waves predominantly through another to activate the solenoids in alternation.

7. In a compressor, in combination, double-acting compression mechanism, a pair of solenoids having cores connected with said mechanism to actuate the same, and alternating current rectifying means connected with the solenoids to pass positive current-impulses predominantly through one solenoid and negative current-impulses predominantly through the other, whereby the solenoids are activated alternately.

8. In a compressor, a piston movable in a given path of travel, an actuating member movable in a second path of travel perpendicular to said given path of travel and a rod connected to said piston and to said actuating member arranged on movement of said actuating member to pass through said given path of travel and solenoid mechanism for moving said actuating member.

9. In a compressor, a piston movable in a given path of travel, an actuating member movable in a second path of travel perpendicular to said given path of travel, a rod connected to said piston, a pivoted lever connected to said rod and connected to said actuating member, said rod and lever being arranged to pass through said given line of travel and a solenoid for moving said actuating member.

10. In a compressor, a piston movable in a given path of travel, an actuating member movable in a second path of travel perpendicular to said given path of travel, a rod connected to said piston, a pivoted lever connected to said rod, a link connected to said lever and to said actuating member, said rod and lever being arranged to pass through said given line of travel and a solenoid for moving said actuating member.

11. In a compressor, a movable compressing member, an element actuated by electromagnetic impulses due to alternate current alternations arranged to move in a given path of travel and connections between said member and said element comprising a member arranged to move through a perpendicular to the said path of travel to cause limitation of movement of the compressing member.

12. In a compressor, a piston, an actuating member actuated by electro-magnetic impulses due to alternate current alternations arranged to move in a given path of travel and linkage connecting said piston and said member comprising a pivoted lever arranged to move through a perpendicular to the said path of travel to cause limitation of movement of the piston.

13. In a compressor, a reciprocatory compressing member having a given line of travel, a solenoid actuated member having a second line of travel at an angle to said given line of travel, said solenoid actuated member being movable variable distances dependent on load, and connecting linkage between the compressing member and the solenoid actuated member arranged to give a fixed limit of movement of said compressing member in one direction for different extents of movement of said solenoid actuated member.

14. In a compressor, a piston, a rod connected to said piston, a member connected to said rod having a given path of travel, said rod passing through a perpendicular to said path of travel and electro-magnetic means actuated by alternations in alternating current operating to oscillate said member in said path of travel.

15. In a compressor, a reciprocatory compressing member having a given line of travel, a solenoid actuated member having a second line of travel at an angle to said given line of travel, said solenoid actuated member being movable variable distances dependent on load, and connecting means for transmitting movement of the solenoid actuated member to the compressing member arranged to give a fixed limit of movement of said compressing member in one direction for different extents of movement of said solenoid actuated member.

In testimony whereof I hereunto affix my signature.

EDWARD T. WILLIAMS.